US012757914B2

(12) United States Patent
Lynglev et al.

(10) Patent No.: US 12,757,914 B2
(45) Date of Patent: Oct. 13, 2026

(54) METHOD FOR PRODUCING A MEAT ANALOGUE PRODUCT USING THERMOSTABILE ENDOPEPTIDASE

(71) Applicant: Novozymes A/S, Bagsvaerd (DK)

(72) Inventors: Gitte Budolfsen Lynglev, Frederiksberg (DK); Mette Holse, Virum (DK)

(73) Assignee: Novozymes A/S, Bagsvaerd (DK)

( * ) Notice: Subject to any disclaimer, the term of this patent is extended or adjusted under 35 U.S.C. 154(b) by 218 days.

(21) Appl. No.: 18/553,747

(22) PCT Filed: Apr. 8, 2022

(86) PCT No.: PCT/EP2022/059459
§ 371 (c)(1),
(2) Date: Oct. 3, 2023

(87) PCT Pub. No.: WO2022/218863
PCT Pub. Date: Oct. 20, 2022

(65) Prior Publication Data

US 2024/0180197 A1 Jun. 6, 2024

(30) Foreign Application Priority Data

Apr. 12, 2021 (DK) ........................... PA 2021 00362

(51) Int. Cl.

| | |
|---|---|
| ***A23J 3/34*** | (2006.01) |
| ***A23J 3/16*** | (2006.01) |
| ***A23J 3/22*** | (2006.01) |
| ***A23J 3/26*** | (2006.01) |

(52) U.S. Cl.
CPC ................. *A23J 3/346* (2013.01); *A23J 3/16* (2013.01); *A23J 3/227* (2013.01); *A23J 3/26* (2013.01)

(58) Field of Classification Search
CPC ........ A23J 3/14; A23J 3/16; A23J 3/18; A23J 3/227; A23J 3/225
See application file for complete search history.

(56) References Cited

U.S. PATENT DOCUMENTS

| | | | | |
|---|---|---|---|---|
| 2005/0287267 A1 | 12/2005 | Maningat et al. | | |
| 2013/0331315 A1 | 12/2013 | Krul et al. | | |
| 2019/0032102 A1* | 1/2019 | Lynglev | .................. | A23J 3/343 |

FOREIGN PATENT DOCUMENTS

| | | | |
|---|---|---|---|
| CN | 106538820 | A | 3/2017 |
| CN | 109619208 | A | 4/2019 |
| CN | 112515034 | A | 3/2021 |
| DE | 10054516 | A1 | 5/2002 |
| WO | 0158276 | A2 | 8/2001 |
| WO | 02/36801 | A2 | 5/2002 |
| WO | 2012141795 | A1 | 10/2012 |
| WO | 2016/087427 | A1 | 6/2016 |
| WO | 2017/117398 | A1 | 7/2017 |
| WO | 2018/125920 | A1 | 7/2018 |
| WO | 2020/038541 | A1 | 2/2020 |
| WO | 2020/089445 | A1 | 5/2020 |

OTHER PUBLICATIONS

Mir et al. (2021). Gluten-Free Bread Technology. Springer Nature. p. 158 Retrieved from https://app.knovel.com/hotlink/toc/id:kpGBT00003/gluten-free-bread-technology/gluten-free-bread-technology (Year: 2021).*
Bohrer, 2019, Food Science and Human Wellness, vol. 8, pp. 320-329.
Chen et al., 2011, Food Hydrocolloids, vol. 25, pp. 887-897.
Cui et al., 2008, Journal of Food Process Engineering, vol. 34, pp. 187-203.
Czarnecki et al., 1993, Journal of Food Science, vol. 58, No. 2, pp. 395-398.
Daronko et al., 1988, Journal of Food Science, vol. 53, No. 6, pp. 1792-1794.
Hans, Literature learning's meat analogues, pp. 1-8.
Murillo et al., 2019, Journal of Food Engineering, vol. 242, pp. 8-20.
Oestergaard et al., 2001, EBI Accession No. AX214152.
Osen et al., 2015, International Journal Food Science and Technology, vol. 50, pp. 1390-1396.
Osen et al., 2014, Journal of Food Engineering, vol. 127, pp. 67-74.
Osen, 2017, Munich Technical University, PhD thesis, pp. 1-195.
Pietsch et al., 2019, vol. 259, pp. 3-11.
Pilli et al., 2008, Journal of Food Process Engineering, vol. 33, pp. 65-82.
Xu et al., 2020, Trends in Food Science and Technology, vol. 99, pp. 167-180.
Zhang et al., 2020, Food Hydrocolloids, vol. 99, p. 105311.
Zhou et al., 2017, Journal of Food Processing and Preservation vol. 41, p. e13301.

* cited by examiner

*Primary Examiner* — Michele L Jacobson
(74) *Attorney, Agent, or Firm* — Yoshimi D. Barron

(57) ABSTRACT

The present invention relates to a method for producing a meat analogue product which comprises texturizing a non-animal protein and adding a thermostable endopeptidase before or during the texturization process.

18 Claims, No Drawings

Specification includes a Sequence Listing.

METHOD FOR PRODUCING A MEAT ANALOGUE PRODUCT USING THERMOSTABILE ENDOPEPTIDASE

CROSS-REFERENCE TO RELATED APPLICATIONS

This application is a 35 U.S.C. 371 national application of international application no. PCT/EP2022/059459 filed Apr. 8, 2022, which claims priority or the benefit under 35 U.S.C. 119 of Danish application no. PA 2021 00362 filed Apr. 12, 2021. The disclosure of each application is fully incorporated herein by reference.

REFERENCE TO SEQUENCE LISTING

This application contains a Sequence Listing in computer readable form. The computer readable form is incorporated herein by reference.

FIELD OF THE INVENTION

The present invention relates to a method for producing a meat analogue product which comprises texturizing a non-animal protein.

BACKGROUND OF THE INVENTION

The growing world population demands sustainably produced protein-rich foods. E.g., legumes, such as soy and pulses, are attractive crops for production of protein-rich foods. But other non-animal protein sources are also being used in food production, e.g., from plants broadly, from algae, or from insects.

Texturized products such as extruded products are used extensively in the food industry. Extrusion is used primarily to give the food a specific texture and distinctive mouthfeel.

Osen et al. (2014), Journal of Food Engineering 127: 67-74, have studied high moisture extrusion cooking of pea protein isolates. They find that the functional properties of the pea protein play a minor role during fiber formation due to the elevated cooking temperature, which exceeds the proteins' denaturation temperature.

Xu et al. (2020), Trends in Food Science & Technology 99, 167-180, provide an overview of the development of processing of food-related biopolymers using reactive extrusion (REX) and enzymes. They divide REX-enzyme processes into two major technological categories: (1) REX-EH processes, which are series systems including an extrusion pre-treatment followed by enzymatic hydrolysis; and (2) eREX processes, which introduce exogenous enzymes before or during REX. They conclude that eREX is still an immature area except for starch saccharification.

Chen et al. (2011), Food Hydrocolloids 25: 887-897, have studied the effects of combined extrusion pre-treatment followed by controlled enzymatic hydrolysis on the emulsifying properties of soy protein isolates.

Czarnecki et al. (1993), Journal of Food Science 58: 395-398, incubated pinto bean high protein fraction with papain and cellulase for 24 or 72 hours followed by freeze-drying, grinding, sieving and extrusion, to obtain new snack type products from beans.

Zhou et al. (2017), J Food Process Preserv. 41: e13301, have studied the effect of extrusion and of papain co-extrusion on pea protein and on antioxidant peptides created by further papain hydrolysis of the extrudates.

WO2017/117398 (Abbott) discloses a method of preparing a protein hydrolysate comprising adding an intact protein source and a protease component to an extruder.

WO2018/125920 (Abbott) discloses a method of preparing a nutritional powder comprising adding an intact protein source, a protease component, a fat component, and water to an extruder.

Extrusion of plant protein can give the protein a fibrous, meat-like structure.

Meat analogue products are meat replacers made from, e.g., plant protein that are designed to mimic the visual appearance, texture and taste of meat products. Meat analogue products may be made by extrusion of, e.g., soy, wheat or pea protein. Extrusion is a thermo mechanical texturization process that causes the protein to unfold. In a high-moisture (HM) extrusion process, a cooling die allows the proteins to re-arrange and form new intermolecular covalent and non-covalent bonds. The cooling die at the end of the extruder creates dense, layered and fibrous meat like structures. In a low-moisture (LM) extrusion process, the products expand when they exit the die and form a puffed solid with a fibrous, insoluble, porous network that can soak up as much as three times its weight in liquids.

Texturized vegetable protein such as extruded vegetable protein, in particular LM extruded vegetable protein (also called TVP) may be formed into various shapes (chunks, flakes, nuggets, grains, and strips) and sizes.

Extrusion has been employed for many years in the production of meat analogues for obtaining meat-like structures from plant protein. It is difficult, though, to obtain extrudates of plant protein, such as legume protein, with acceptable textural and functional properties for them to be used in meat analogues without having to add non-natural ingredients, such as methylcellulose, to improve, e.g., meat-like coherence and adhesiveness.

Methylcellulose is used in the final product formulation and acts as a binder, ensuring that the product maintains its texture and shape. Methylcellulose has the ability to show thermo-gelling upon heating which keeps the product together and reduces water loss during cooking.

WO2020/038541 (Raisio Nutrition) discloses a method for manufacturing a plant-based meat substitute by passing a mixture containing plant protein material and oat material and optionally a crosslinking enzyme and/or a protein deamidating enzyme at a temperature of 25-55° C. through an extruder. Meat substitutes were produced where transglutaminase was included using low temperature and high temperature extrusion and for each sensory property tested, and also for the overall quality rating, the low temperature samples gained better ratings than the corresponding high temperature samples.

CN109619208A (UNIV HEILONGJIANG BAYI AGRICULTURAL) discloses a method for preparing a flavour-enhanced imitation meat food by extrusion puffing of raw materials comprising bean seed flour and soy protein. Ultrasonic enzymolysis using Alcalase and Flavourzyme may be applied for a duration of 10-20 minutes, preferably followed by a Maillard reaction, before the extrusion puffing to provide a strong flavour and a persistent aroma.

Bohrer (2019), Food Science and Human Wellness 8(4): 320-329, has investigated the formulation and nutritional composition of modern meat analogue products, and find that methylcellulose is included in many such products. The health of ingredients such as methylcellulose have been challenged although no real health risks or concerns have been discovered. However, the push from consumers for cleaner labels on food products has influenced food processors to attempt to limit or eliminate the use of such ingredients in processed meat analogue products.

It is an object of the present invention to provide texturized non-animal protein material having better functional properties making them suitable for use in meat analogue products such as burger patties, mince, sausages or chicken nugget analogues.

SUMMARY OF THE INVENTION

The present inventors have surprisingly found that by adding a thermostable endopeptidase to non-animal protein before or during a texturization process, such as an extrusion process, a texturized non-animal protein material is provided which, when used in a meat analogue product, such as a burger patty, gives improved properties such as higher adhesiveness and/or higher water holding capacity. A higher adhesiveness of e.g. the raw burger patty allows for reducing or eliminating the use of ingredients such as methylcellulose, which are perceived by consumers as non-natural. A higher water holding capacity gives a higher juiciness of the meat analogue product.

The present invention therefore provides a method of producing a meat analogue product comprising the following steps:

a) texturizing a non-animal protein (i) by passing it through an extruder comprising a barrel, at least one screw and a nozzle or cooling die, or (ii) by shear cell technology, thereby forming at least one string or slab of texturized protein material which is optionally cut into granulates,
b) adding a thermostable endopeptidase to at least part of the non-animal protein before or during step a),
c) optionally mincing or shredding the texturized protein material, and
d) mixing the non-animal protein with other ingredients to obtain the meat analogue product, wherein the mixing with other ingredients may be performed before step a), after step a) but before optional step c) and/or after optional step c).

Despite the harsh conditions during extrusion, direct addition of protease during the process surprisingly led to a significant protein hydrolysis measured by degree of hydrolysis (% DH) of the extrudates. Even a moderate increase in % DH leads to better solubility and thus functionality in the final application.

Definitions

The term "isolated" means a polypeptide, nucleic acid, cell, or other specified material or component that is separated from at least one other material or component with which it is naturally associated as found in nature, including but not limited to, for example, other proteins, nucleic acids, cells, etc. An isolated polypeptide includes, but is not limited to, a culture broth containing the secreted polypeptide.

The term "mature polypeptide" means a polypeptide in its mature form following N terminal processing (e.g., removal of signal peptide). In one aspect, the mature polypeptide of SEQ ID NO: 1 is amino acids 1-413 and the mature polypeptide of SEQ ID NO: 2 is amino acids 1-188. It is known in the art that a host cell may produce a mixture of two of more different mature polypeptides (i.e., with a different C terminal and/or N terminal amino acid) expressed by the same polynucleotide. It is also known in the art that different host cells process polypeptides differently, and thus, one host cell expressing a polynucleotide may produce a different mature polypeptide (e.g., having a different C terminal and/or N terminal amino acid) as compared to another host cell expressing the same polynucleotide.

The term "purified" means a nucleic acid or polypeptide that is substantially free from other components as determined by analytical techniques well known in the art (e.g., a purified polypeptide or nucleic acid may form a discrete band in an electrophoretic gel, chromatographic eluate, and/or a media subjected to density gradient centrifugation). A purified nucleic acid or polypeptide is at least about 50% pure, usually at least about 60%, about 65%, about 70%, about 75%, about 80%, about 85%, about 90%, about 91%, about 92%, about 93%, about 94%, about 95%, about 96%, about 97%, about 98%, about 99%, about 99.5%, about 99.6%, about 99.7%, about 99.8% or more pure (e.g., percent by weight on a molar basis). In a related sense, a composition is enriched for a molecule when there is a substantial increase in the concentration of the molecule after application of a purification or enrichment technique. The term "enriched" refers to a compound, polypeptide, cell, nucleic acid, amino acid, or other specified material or component that is present in a composition at a relative or absolute concentration that is higher than a starting composition.

Sequence identity: The relatedness between two amino acid sequences or between two nucleotide sequences is described by the parameter "sequence identity".

For purposes of the present invention, the sequence identity between two amino acid sequences is determined as the output of "longest identity" using the Needleman-Wunsch algorithm (Needleman and Wunsch, 1970, J. Mol. Biol. 48: 443-453) as implemented in the Needle program of the EMBOSS package (EMBOSS: The European Molecular Biology Open Software Suite, Rice et al., 2000, Trends Genet. 16: 276-277), preferably version 6.6.0 or later. The parameters used are a gap open penalty of 10, a gap extension penalty of 0.5, and the EBLOSUM62 (EMBOSS version of BLOSUM62) substitution matrix. In order for the Needle program to report the longest identity, the nobrief option must be specified in the command line. The output of Needle labeled "longest identity" is calculated as follows:

$$(\text{Identical Residues} \times 100)/(\text{Length of Alignment} - \text{Total Number of Gaps in Alignment})$$

DETAILED DESCRIPTION OF THE INVENTION

The present invention relates to a method of producing a meat analogue product comprising the following steps:

a) texturizing a non-animal protein (i) by passing it through an extruder comprising a barrel, at least one screw and a nozzle or cooling die, or (ii) by shear cell technology, thereby forming at least one string or slab of texturized protein material which is optionally cut into granulates,
b) adding a thermostable endopeptidase to at least part of the non-animal protein before or during step a),
c) optionally mincing or shredding the texturized protein material, and
d) mixing the non-animal protein with other ingredients to obtain the meat analogue product, wherein the mixing with other ingredients may be performed before step a), after step a) but before optional step c) and/or after optional step c).

Non-Animal Protein

The non-animal protein may be, e.g., plant protein, aquatic protein, such as from seaweed or microalgae, or fermented protein, such as mycoprotein like Quorn, or any combination thereof.

The non-animal protein is preferably plant protein.

The plant protein may be obtained e.g. from legumes, such as from pulses, e.g. peas, lentils, chickpea, or from oil crops, e.g. soybean, peanuts; from seeds, e.g. hemp, sunflower, flax, sesame, chia; from cereals, e.g. wheat, oats, corn; from pseudocereals, e.g. quinoa; from grasses or pasture legumes, e.g. alfalfa, clover; from any of rapeseed, canola, nuts, vegetables, fruits, mushrooms, cottonseed; or any combination of any of these.

In a preferred embodiment, the non-animal protein is legume protein, preferably soy protein or pea protein.

The non-animal protein may be legume protein, where the legume protein is mixed with non-animal protein from other sources such as from other plants before or after step a).

The non-animal protein may be soy protein, where the soy protein is mixed with non-animal protein from other sources such as from other plants, e.g., wheat and/or other legumes, such as pea protein, before or after step a).

The non-animal protein may be pea protein, where the pea protein is mixed with non-animal protein from other sources such as from other plants, e.g., other legumes, such as soy protein, before or after step a).

The non-animal protein may be a non-animal protein concentrate, such as a plant protein concentrate or a legume protein concentrate, preferably a legume protein concentrate having a protein to dry matter ratio of 40-70% (w/w). Preferably, the legume protein concentrate is a soy protein concentrate, a pea protein concentrate, a chickpea protein concentrate, a mung bean protein concentrate, a lentil protein concentrate or a fava bean protein concentrate, more preferably a soy protein concentrate or a pea protein concentrate.

The non-animal protein may be a non-animal protein isolate, such as a plant protein isolate or a legume protein isolate, preferably a legume protein isolate having a protein to dry matter ratio of 70-95% (w/w). Preferably, the legume protein isolate is a soy protein isolate, a pea protein isolate, a chickpea protein isolate, a mung bean protein isolate, a lentil protein isolate or a fava bean protein isolate, more preferably a soy protein isolate or a pea protein isolate.

The non-animal protein may be a dehulled legume flour, preferably a dehulled legume flour having a protein to dry matter ratio of 10-30%, preferably 15-30%, (w/w). Preferably, the dehulled legume flour is a dehulled pea flour, a dehulled chickpea flower, a dehulled mung bean flour, a dehulled lentil flour or a dehulled fava bean flour, most preferably a dehulled pea flour.

The non-animal protein may be a defatted legume flour, preferably a defatted legume flour having a protein to dry matter ratio of 10-30%, preferably 15-30%, (w/w). Preferably, the defatted legume flour is a defatted soy flour.

The non-animal protein may be defatted legume flakes, preferably defatted legume flakes having a protein to dry matter ratio of 40-65% (w/w). Preferably, the defatted legume flakes are defatted soy flakes.

The non-animal protein may be a soybean meal.

Extrusion

Since the 1960s extrusion cooking has been employed to produce meat analogues using especially soy protein as raw material and until a few years ago primarily used as meat extenders to reduce cost of minced meat in the traditional meat industry. However especially over the last 10 years much more focus has been on finding applicable extrudates for a full substitution of meat based patties and sausages (see, e.g., chapter 6 "Plant-Based Meat Analogues" by K. Kyriakopoulou et al. in "Sustainable Meat Products and Processing", 2018 ed. Charis Galanakis, ISBN electronic 9780128156889).

Extrusion is a thermomechanical process by which moistened, expandable, starchy and proteinaceous food materials are plasticized and pushed through a die by a combination of pressure, heat, and mechanical shear. A typical extruder set-up consists of a feeding system, a screw, a barrel, a die, and a cutting machine. Furthermore, a preconditioning system can optionally be introduced before the extrusion. The extruder barrel may be divided into 7-9 sections, often referred to as temperature zones, which can be heated separately. Material is added to the first section of the extruder using a volumetrically or gravimetrically controlled feeder. A pump is used to feed water, possibly including enzymes, or preconditioned material with adjusted moisture content to the second section of the extruder. The screw configuration used can consist of forward and reverse transport elements. In the feeding zone, the material is mixed, homogenized and then transported to the compression zone. In that zone, a reduction in screw depth and pitch exists, which results in an increase in shear rate, temperature and pressure. The mechanical energy dissipated through the rotation of the screws increase the processing temperature inside the extruder. Between 130 and 180° C., the proteins denaturate resulting in a viscoelastic mass that can be aligned in the cooling-die. To summarize, this change in the process conditions convert the solid material into a fluid melt. Before exiting the extruder, a maximum temperature and pressure is reached leading to an immediate reduction of the viscosity of the extruded material. In case of meat-analogue production by high-moisture extrusion, the cooling-die is long to create alignment and to prevent severe material expansion, which could destroy the newly formed structure.

The successful preparation of meat-analogue products requires the control of the extrusion parameters, such as screw speed, moisture content of the feed, barrel temperature, extruder properties and chemical and physical composition of the feed. The skilled person will know how to adjust the extrusion parameters to optimize the process.

For meat-analogue production, two product categories have been developed, depending on the amount of water added during extrusion: high and low-moisture extrusion.

In low-moisture extrusion, flours or concentrates with low-moisture content are transformed into textured vegetable proteins (TVP) also called dry extrudates, ingredients are hydrated with e.g. 15% moisture during extrusion, resulting in extrudates with a lower final moisture content. For the final meat-analogue recipe they are rehydrated and mixed with other ingredients before being cooked, e.g. fried. Products from low-moisture extrusion, present a sponge-like structure and expand and absorb water rapidly. They have typically been used as meat extenders but are these days also used partly or fully as meat analogues such as sausages and beef patties.

In high-moisture extrusion, ingredients are hydrated with e.g. 70% moisture during extrusion, resulting in extrudates with higher final moisture content. Mostly, a co-rotating twin-screw extruder is used for this application and products are used directly for further processing or are frozen after extrusion to increase the shelf-life and possibly enhance the structure. The high moisture products can either be used as they are or shredded to mimic chicken or gullasch like meat pieces or minced to different sizes to go into patties or sausages.

According to Egbert and Borders, 2006, Achieving success with meat analogs, Food Technol-Chicago, 60(1): 28-34, a meat analogue product may contain water (50-80%), textured vegetable protein (10-25%), nontextured protein (4-20%), flavorings (3-10%), fat (0-15%), binging agents (1-5%), and coloring agents (0-0.5%). The combination of ingredients yields meat analogues that are accepted in terms of sensory attributes. The high water content not only reduces the costs of the product, but provides the desired juiciness, acts as a plasticizer during processing and helps on emulsification.

In preferred embodiments of the method of the invention, the non-animal protein is passed through an extruder, preferably a twin-screw extruder, such as a co-rotating or counter-rotating twin-screw extruder, more preferably a co-rotating twin-screw extruder.

The non-animal protein is preferably passed through the extruder at a temperature of 20-180° C., preferably 50-170° C.

In preferred embodiments, the extruder has more than one temperature zone, such as 2-10, preferably 5-9, temperature zones.

In the embodiments of the invention, where in step a) a high-moisture extrusion process is used, the extruder preferably comprises a cooling die. In such embodiments, the moisture content of the non-animal protein when passing it through the extruder is preferably 40-90%, more preferably 50-75% (w/w).

In the embodiments of the invention, where in step a) a low-moisture extrusion process is used, the extruder preferably comprises a nozzle. In such embodiments, the moisture content of the non-animal protein when passing it through the extruder is preferably 1-35%, more preferably 5-30% (w/w).

Shear Cell Technology

Based on the recognition that extrusion is an effective, but not a well-defined process, a technology based on well-defined shear flow-deformation was introduced a decade ago to produce fibrous products. Shearing devices inspired on the design of rheometers so called shear cells, were developed in which intensive shear can be applied in a cone-in-cone or in a couette geometry. The final structure obtained with this technique depends on the ingredients and on the processing conditions. Fibrous products are obtained with several plant protein blends, such as soy protein concentrate or soy protein isolate (SPI) blended with, e.g., wheat gluten (WG), pectin and/or starch. Fibrous products can also be obtained by use of calcium caseinate. The technology has proven successful, at least up to pilot scale (BL Deckers et al., in Trends in Food Science & Technology 81 (2018) 25-36). High temperatures (above 100° C.) are usually also applied when using shear cell technology.

As in extrusion processes, thermostable proteases can be applied in other perhaps more gentle processing for making meat analogues such as shear cell technology and hereby result in the same improved performance of the extrudate and the final formulated product.

Endopeptidase

In the methods of the present invention, a thermostable endopeptidase is added to non-animal protein before or during a texturization process, such as an extrusion process or a shear cell technology process.

A thermostable endopeptidase in the context of the present invention may be defined as an endopeptidase which after incubation for 15 minutes at 80° C. and a pH where the endopeptidase exhibits at least 40% of its maximum activity has a residual activity of at least 80% relative to its activity after incubation at 37° C.

A thermostable endopeptidase in the context of the present invention may be defined as an endopeptidase which after incubation for 15 minutes at 80° C. and pH 9 has a residual activity of at least 80% relative to its activity after incubation at 37° C.

The skilled person will know how to determine the residual activity. It may be determined using the Residual Activity Measurement assay as described in the Examples of WO2016/087427.

Preferably, the thermostable endopeptidase is a nonspecific endopeptidase. The skilled person will know if an endopeptidase is a specific endopeptidase, which, e.g., cleaves after Arg or Lys, or if it is a nonspecific endopeptidase. A nonspecific endopeptidase may also be characterized as an endopeptidase having a broad specificity.

A nonspecific endopeptidase may be characterized in that incubation of 0.5% (w/w) BSA with the endopeptidase for 4 hours at a temperature and pH where the endopeptidase exhibits at least 40% of its maximum activity results in a degree of hydrolysis of at least 10%, preferably at least 15%.

In some embodiments, the thermostable endopeptidase has been isolated.

In some embodiments, the thermostable endopeptidase has been purified.

In some embodiments, the thermostable endopeptidase has a sequence identity to the mature polypeptide of any of SEQ ID NOs: 1 or 2 of at least 60%, e.g., at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or 100%. The endopeptidase may differ by up to 10 amino acids, e.g., 1, 2, 3, 4, 5, 6, 7, 8, 9, or 10, from the mature polypeptide of any of SEQ ID NOs: 1 or 2.

In some embodiments, the thermostable endopeptidase has a sequence identity to the polypeptide of SEQ ID NO: 1 of at least 60%, e.g., at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or 100%. The endopeptidase may differ by up to 10 amino acids, e.g., 1, 2, 3, 4, 5, 6, 7, 8, 9, or 10, from the polypeptide of SEQ ID NO: 1.

In some embodiments, the thermostable endopeptidase has a sequence identity to the polypeptide of SEQ ID NO: 2 of at least 60%, e.g., at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or 100%. The endopeptidase may differ by up to 10 amino acids, e.g., 1, 2, 3, 4, 5, 6, 7, 8, 9, or 10, from the polypeptide of SEQ ID NO: 2.

In some embodiments, the thermostable endopeptidase comprises or consists of the amino acid sequence of any of SEQ ID NOs: 1 or 2 or an allelic variant of any of these.

In some embodiments, the thermostable endopeptidase is a variant of the mature polypeptide of any of SEQ ID NOs: 1 or 2 comprising a substitution, deletion, and/or insertion at one or more (e.g., several) positions. In some embodiments, the number of amino acid substitutions, deletions and/or insertions introduced into the mature polypeptide of SEQ ID NO: 2 is up to 10, e.g., 1, 2, 3, 4, 5, 6, 7, 8, 9, or 10.

In the context of the present invention, the term "variant" means a polypeptide having endopeptidase activity comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding one or more (e.g., several) amino acids, e.g., 1-5 amino acids, adjacent to and immediately following the amino acid occupying a position.

The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function, such as a poly-histidine tract, an antigenic epitope or a binding domain.

Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, In, The Proteins, Academic Press, New York. Common substitutions are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly.

Alternatively, the amino acid changes are of such a nature that the physico-chemical properties of the polypeptides are altered. For example, amino acid changes may affect the thermal stability of the polypeptide, alter the substrate specificity, change the pH optimum, and the like.

Essential amino acids in a polypeptide can be identified according to procedures known in the art, such as site-directed mutagenesis or alanine-scanning mutagenesis (Cunningham and Wells, 1989, Science 244: 1081-1085). In the latter technique, single alanine mutations are introduced at every residue in the molecule, and the resultant mutant molecules are tested for endopeptidase activity to identify amino acid residues that are critical to the activity of the molecule. See also, Hilton et al., 1996, J. Biol. Chem. 271: 4699-4708. The active site of the enzyme or other biological interaction can also be determined by physical analysis of structure, as determined by such techniques as nuclear magnetic resonance, crystallography, electron diffraction, or photoaffinity labeling, in conjunction with mutation of putative contact site amino acids. See, for example, de Vos et al., 1992, Science 255: 306-312; Smith et al., 1992, J. Mol. Biol. 224: 899-904; Wlodaver et al., 1992, FEBS Lett. 309: 59-64. The identity of essential amino acids can also be inferred from an alignment with a related polypeptide.

Single or multiple amino acid substitutions, deletions, and/or insertions can be made and tested using known methods of mutagenesis, recombination, and/or shuffling, followed by a relevant screening procedure, such as those disclosed by Reidhaar-Olson and Sauer, 1988, Science 241: 53-57; Bowie and Sauer, 1989, Proc. Natl. Acad. Sci. USA 86: 2152-2156; WO 95/17413; or WO 95/22625. Other methods that can be used include error-prone PCR, phage display (e.g., Lowman et al., 1991, Biochemistry 30: 10832-10837; U.S. Pat. No. 5,223,409; WO 92/06204), and region-directed mutagenesis (Derbyshire et al., 1986, Gene 46: 145; Ner et al., 1988, DNA 7: 127).

Mutagenesis/shuffling methods can be combined with high-throughput, automated screening methods to detect activity of cloned, mutagenized polypeptides expressed by host cells (Ness et al., 1999, Nature Biotechnology 17: 893-896). Mutagenized DNA molecules that encode active polypeptides can be recovered from the host cells and rapidly sequenced using standard methods in the art. These methods allow the rapid determination of the importance of individual amino acid residues in a polypeptide.

A thermostable endopeptidase to be used in a method of the present invention may be obtained from microorganisms of any genus. For purposes of the present invention, the term "obtained from" as used herein in connection with a given source shall mean that the polypeptide encoded by a polynucleotide is produced by the source or by a strain in which the polynucleotide from the source has been inserted. In one aspect, the polypeptide obtained from a given source is secreted extracellularly.

In some preferred embodiments, the thermostable endopeptidase may be obtained from *Nocardiopsis*, preferably *Nocardiopsis sp.* or *Nocardiopsis prasina.*

The endopeptidase may be obtained from an organism characterized as a hyperthermophile. The endopeptidase may be obtained from a hyperthermophilic bacterium, e.g., from *Thermotoga, Thermosipho, Fervidobacterium, Aquifex, Calderobacterium, Thermocrinis*, or it may be obtained from archaea, e.g., from *Sulfolobus, Metallosphaera, Acidianus, Stygiolobus, Sulfurococcus, Sulfurisphaera, Thermoproteus, Pyrobaculum, Thermofilum, Thermocladium, Caldivirga, Desulfurococcus, Staphylothermus, Sulfophobococcus, Stetteria, Aeropyrum, Ignicoccus, Thermosphaera, Thermodiscus, Pyrodictium, Hyperthermus, Pyrolobus, Thermococcus, Pyrococcus, Archaeoglobus, Ferroglobus, Methanothermus, Methanococcus, Methanopyrus.*

In some preferred embodiments, the thermostable endopeptidase may be obtained from *Pyrococcus*. In some preferred embodiments, the thermostable endopeptidase may be obtained from *Pyrococcus furiosus*.

Strains of *Nocardiopsis* and *Pyrococcus* are readily accessible to the public in a number of culture collections, such as the American Type Culture Collection (ATCC), Deutsche Sammlung von Mikroorganismen und Zellkulturen GmbH (DSMZ), Centraalbureau Voor Schimmelcultures (CBS), and Agricultural Research Service Patent Culture Collection, Northern Regional Research Center (NRRL).

The amount of thermostable endopeptidase to be used in the method of the invention is preferably 1-5000 mg of enzyme protein per kilogram of protein, more preferably 1-2500, even more preferably 1-1000, and most preferably 1-500, such as 5-500, mg of enzyme protein per kilogram of protein.

Dosage is given in mg EP/kg protein which is mg enzyme protein per amount of protein in the substrate.

Producing a Meat Analogue Product

In a preferred embodiment of the invention, the endopeptidase is added to the non-animal protein immediately before or during step a). It is to be understood that addition of the endopeptidase to the non-animal protein immediately before or during step a) means there is no pre-incubation.

In a preferred embodiment, the non-animal protein is added to the extruder or shear cell technology device and subsequently an aqueous solution of the endopeptidase is added.

In a particularly preferred embodiment, the non-animal protein is texturized by passing it through an extruder, and the endopeptidase is fed directly to the extruder, preferably an aqueous solution of the endopeptidase is fed directly to the extruder. Preferably, the non-animal protein and an aqueous solution of the endopeptidase are added separately to the feeding zone of the extruder.

The endopeptidase may also be added to an aqueous solution or suspension of the non-animal protein immediately before feeding it to the extruder, i.e. without a preincubation step.

In other embodiments of the invention, the endopeptidase is added to and incubated with at least part of the non-animal protein before step a). In such embodiments, the mixing with other ingredients may be performed before or during incubation of at least part of the non-animal protein with the endopeptidase but before step a). And/or the mixing with other ingredients may be performed after step a) but before optional step c). And/or the mixing with other ingredients may be performed after optional step c).

In some embodiments, the endopeptidase is added to and incubated with part of the non-animal protein before step a). Such incubation may be optionally followed by at least partially drying the part of the non-animal protein which has been incubated with the endopeptidase. The part of the non-animal protein which has been incubated with the endopeptidase and optionally dried is mixed with the rest of the non-animal protein before feeding it into the extruder. The part of the non-animal protein which is incubated with the endopeptidase may be 5-60%, such as 10-50%, of the non-animal protein.

In some embodiments, the non-animal protein which has been subjected to steps a) and b) may be mixed with non-animal protein which has been texturized without adding a thermostable endopeptidase before or during texturization. As shown in Example 11, burger patties where only part of the texturized non-animal protein has been subjected to a thermostable endopeptidase during texturization still have a higher water holding capacity and thus a higher juiciness and also a higher adhesiveness before cooking.

In the methods of the invention, the non-animal protein is mixed with other ingredients to obtain a meat analogue product. The mixing with other ingredients may be performed before step a), it may be performed after step a) but before optional step c), and/or it may be performed after optional step c). E.g., it may be mixed with one or more ingredients before step a) and with one or more other ingredients after steps a) and b), such as before or after optional step c).

The one or more ingredients may be selected from non-texturized plant protein, such as soy protein isolate, wheat gluten, fiber such as pectin, starch such as corn starch, pea starch and/or potato starch, salt, colour, aroma, flavor, spices, and/or oil or fat such as coconut fat, sunflower oil and/or rapeseed oil.

Non-texturized plant protein, such as e.g. soy protein isolate, may be added as an ingredient in, e.g., burger patties as a binder.

The meat-analogue product produced by a method of the invention may be, e.g., a minced-meat analogue product, a burger patty, a sausage, a meat-ball analogue product, a chicken nugget analogue product, a gullasch meat analogue product or a schnitzel analogue product. In a preferred embodiment, the meat-analogue product produced by a method of the invention is a burger patty.

The meat analogue product obtained by a method of the invention preferably has an adhesiveness which is at least 20% better, more preferably at least 50% better, compared to a meat analogue product obtained using the same method but without addition of an endopeptidase.

The skilled person will know how to determine the adhesiveness. It may preferably be determined in line with what is described in the Examples. A higher negative number means a better adhesiveness.

The meat analogue product obtained by a method of the invention preferably has a chewiness which is at most 5% reduced, preferably at most 3% reduced, compared to a meat analogue product obtained using the same method but without addition of an endopeptidase.

The skilled person will know how to determine the chewiness. It may preferably be determined in line with what is described in the Examples.

The meat analogue product obtained by a method of the invention preferably comprises 5-40%, more preferably 12-40%, even more preferably 15-40%, most preferably 15-25%, (w/w) texturized non-animal protein before cooking.

The meat analogue product obtained by a method of the invention preferably comprises 5-40%, more preferably 12-40%, even more preferably 15-40%, most preferably 15-25%, (w/w) non-animal protein having been subjected to steps a) and b) of the method of the invention.

In the meat analogue product obtained by a method of the invention, the other ingredients excluding water preferably constitute 2-50%, more preferably 3-30%, (w/w) before cooking.

The meat analogue product obtained by a method of the invention preferably does not comprise methylcellulose.

PREFERRED EMBODIMENTS

1. A method for producing a meat analogue product comprising the following steps:
   a) texturizing a non-animal protein (i) by passing it through an extruder comprising a barrel, at least one screw and a nozzle or cooling die, or (ii) by shear cell technology, thereby forming at least one string or slab of texturized protein material which is optionally cut into granulates,
   b) adding a thermostable endopeptidase to at least part of the non-animal protein before or during step a),
   c) optionally mincing or shredding the texturized protein material, and
   d) mixing the non-animal protein with other ingredients to obtain the meat analogue product, wherein the mixing with other ingredients may be performed before step a), after step a) but before optional step c) and/or after optional step c).

2. The method of embodiment 1, wherein the non-animal protein is plant protein, preferably legume protein, more preferably soy protein or pea protein.
3. The method of any of the preceding embodiments, wherein the non-animal protein is a non-animal protein flour, non-animal protein flakes, a non-animal protein concentrate or a non-animal protein isolate.
4. The method of any of the preceding embodiments, wherein the non-animal protein is a non-animal protein flour having a particle size of 100-3,000 micrometer.
5. The method of any of embodiments 1-4, wherein the non-animal protein is a non-animal protein concentrate or a non-animal protein isolate, preferably a legume protein concentrate or a legume protein isolate, more preferably a soy protein concentrate, a pea protein concentrate, a soy protein isolate or a pea protein isolate.

6. The method of any of embodiments 1-3, wherein the non-animal protein is a soybean meal or a defatted soy flour.
7. The method of any of the preceding embodiments, where in step a), the non-animal protein is passed through an extruder, preferably a twin-screw extruder, such as a co-rotating or counter-rotating twin-screw extruder, more preferably a co-rotating twin-screw extruder.
8. The method of the preceding embodiment, wherein the non-animal protein is passed through the extruder at a temperature of 20-180° C., preferably 50-170° C.
9. The method of any of the two preceding embodiments, wherein the extruder has more than one temperature zone, such as 2-10, preferably 5-9, temperature zones.
10. The method of any of the three preceding embodiments, where in step a) a high-moisture extrusion process is used, and preferably wherein the extruder comprises a cooling die.
11. The method of the preceding embodiment, wherein the moisture content of the non-animal protein when passing it through the extruder is 40-90%, preferably 50-75% (w/w).
12. The method of any of embodiments 7-9, where in step a) a low-moisture extrusion process is used, and preferably wherein the extruder comprises a nozzle.
13. The method of the preceding embodiment, wherein the moisture content of the non-animal protein when passing it through the extruder is 1-35%, preferably 5-30% (w/w).
14. The method of any of the preceding embodiments, wherein the meat-analogue product is a minced-meat analogue product, a burger patty, a sausage, a meat-ball analogue product, a chicken nugget analogue product, a gullasch meat analogue product or a schnitzel analogue product.
15. The method of any of the preceding embodiments, wherein the thermostable endopeptidase is a non-specific endopeptidase.
16. The method of the preceding embodiment, wherein the nonspecific endopeptidase is characterized in that incubation of 0.5% (w/w) BSA with the endopeptidase for 4 hours at a temperature and pH where the endopeptidase exhibits at least 40% of its maximum activity results in a degree of hydrolysis of at least 10%.
17. The method of any of the preceding embodiments, wherein the thermostable endopeptidase is an endopeptidase, which after incubation for 15 minutes at 80° C. and pH 9 has a residual activity of at least 80% relative to its activity after incubation at 37° C.
18. The method of any of the preceding embodiments, wherein the thermostable endopeptidase (i) has at least 60% sequence identity, preferably at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or 100% sequence identity, to the polypeptide of any of SEQ ID NOs: 1 or 2, (ii) is encoded by a polynucleotide having at least 60% sequence identity, preferably at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or 100% sequence identity, to the coding sequence of any of SEQ ID NOs: 1 or 2, or (iii) is a variant of the polypeptide of any of SEQ ID NOs: 1 or 2 comprising a substitution, deletion, and/or insertion at one or more positions.
19. The method of any of the preceding embodiments, wherein the thermostable endopeptidase is obtained from *Pyrococcus*, preferably *Pyrococcus furiosus*, or from *Nocardiopsis*, preferably *Nocardiopsis* sp.
20. The method of any of the preceding embodiments, wherein the endopeptidase is added to the non-animal protein at most 5 minutes, preferably at most 3 minutes, more preferably at most 1 minute, before step a).
21. The method of any of the preceding embodiments, wherein the endopeptidase is added to the non-animal protein immediately before or during step a).
22. The method of any of the preceding embodiments, wherein the endopeptidase is added to the non-animal protein immediately before or during step a) without the non-animal protein being pre-incubated with the endopeptidase before step a).
23. The method of any of embodiments 1-20, where before step a), the endopeptidase is added to and incubated with at least part of the non-animal protein.
24. The method of the preceding embodiment, wherein the mixing with other ingredients is performed (i) before or during incubation of at least part of the non-animal protein with the endopeptidase but before step a), (ii) after step a) but before optional step c), and/or (iii) after optional step c).
25. The method of any of the two preceding embodiments, where before step a), the endopeptidase is added to and incubated with part of the non-animal protein, optionally followed by at least partially drying the part of the non-animal protein which has been incubated with the endopeptidase, and mixing the part of the non-animal protein which has been incubated with the endopeptidase and optionally dried with the rest of the non-animal protein.
26. The method of the preceding embodiment, wherein the part of the non-animal protein which is incubated with the endopeptidase is 5-60%, such as 10-50%, of the non-animal protein.
27. The method of any of the preceding embodiments, wherein the non-animal protein after steps a) and b) is mixed with non-animal protein having been subjected to step a) but not step b).
28. The method of any of the preceding embodiments, wherein the non-animal protein which has been subjected to steps a) and b) is mixed with non-animal protein which has been texturized without adding a thermostable endopeptidase before or during texturization.
29. The method of any of the preceding embodiments, wherein the other ingredients comprise non-animal protein which has been texturized without adding a thermostable endopeptidase before or during texturization.
30. The method of any of the preceding embodiments, wherein at least 5% (w/w), preferably at least 10% (w/w), of texturized non-animal protein in the meat-analogue product has been subjected to addition of a thermostable endopeptidase before or during texturization.
31. The method of any of the preceding embodiments, wherein 5-100% (w/w), preferably 10-100% (w/w), of texturized non-animal protein in the meat-analogue product has been subjected to addition of a thermostable endopeptidase before or during texturization 32. The method of any of the preceding embodiments, wherein 10-50% (w/w), preferably 20-40% (w/w), of texturized non-animal protein in the meat-analogue product has been subjected to addition of a thermostable endopeptidase before or during texturization.
33. The method of any of the preceding embodiments, wherein the non-animal protein is mixed with one or more ingredients selected from non-texturized plant protein, such as soy protein isolate, wheat gluten, fiber such as pectin, starch such as corn starch, pea starch and/or potato starch, salt, colour, aroma, flavor, spices, and/or oil or fat such as coconut fat, sunflower oil and/or rapeseed oil.
34. The method of any of the preceding embodiments, wherein the meat analogue product obtained has an adhesiveness which is at least 20% better, preferably at least 50% better, compared to a meat analogue product obtained using the same method but without addition of an endopeptidase.
35. The method of any of the preceding embodiments, wherein the meat analogue product obtained has a chewiness which is at most 5% reduced, preferably at most 3% reduced, compared to a meat analogue product obtained using the same method but without addition of an endopeptidase.
36. The method of any of the preceding embodiments, wherein the meat analogue product before cooking comprises 5-40%, preferably 12-40%, more preferably 15-40%, even more preferably 15-25%, (w/w) texturized non-animal protein.
37. The method of any of the preceding embodiments, wherein the meat analogue product before cooking comprises 5-40%, preferably 12-40%, more preferably 15-40%, even more preferably 15-25%, (w/w) non-animal protein having been subjected to steps a) and b).
38. The method of any of the preceding embodiments, wherein the other ingredients excluding water constitute 2-50%, preferably 3-30%, (w/w) of the meat analogue product before cooking.
39. The method of any of the preceding embodiments, wherein the meat analogue product does not comprise methylcellulose.

EXAMPLES

Summary

In order to improve substrate functionality several proteases have been tested. The extrudates have been formulated into patties similar to what is commercially available. Both the extrudates and the patties have been analysed by chemical and physical methods of analysis. The methods applied are well known from the existing food and meat industry.

Despite the harsh conditions during extrusion, direct addition of protease during the process led to a significant protein hydrolysis measured by degree of hydrolysis (% DH) of the extrudates (Example 3). Even a moderate increase in % DH leads to better solubility and thus functionality in the final application. Further the density of the dried extrudates was increased by the proteases tested (Example 4). A higher density is experienced as a more meat like structure.

FT-IR analysis showed a higher level of intermolecular protein interactions of the protease treated extrudates (Example 5), reflecting a better solubilization followed by process induced formation of a higher degree of covalent and non-covalent bonds.

Texture analysis of the patties showed that protease addition increased the adhesiveness of the mince to a higher degree than methylcellulose addition both for HM and LM extrudates (Examples 6 and 7). Hence, the protease addition would yield burger patties which would be easier to shape, and it would be easier to retain the coherency.

Further, a functional change was observed in terms of increased water holding capacity of the protease treated extrudate based patties as measured by LF-NMR (Example 8). The observed presence of more loosely bound water will in turn lead to more adhesiveness and juiciness of the formulated patties.

Residual protease activity was not observed in the final extrudates (Example 9). Hence, the enzyme treatment can be defined as a processing aid and consequently no labelling is needed on the final food product.

Materials

The proteases used are the following:

Protease 1 is a thermostable endopeptidase from *Pyrococcus furiosus* having the sequence shown as SEQ ID NO:1.

Protease 2 is a thermostable endopeptidase from *Nocardiopsis sp.* having the sequence shown as SEQ ID NO:2.

Protease 3 is the commercial endopeptidase Alcalase Pure from *Bacillus licheniformis* which is included for comparison.

Example 1

Extrusion Settings for High Moisture and Low Moisture Extrusion Using Thermostable Proteases (Trial 1-3)

Extrusion trials for testing of Protease 1 and Protease 2 were carried out using a pilot-scale extruder (Coperion, ZsK, Stuttgart, Germany). The extruder was an intermeshing, co-rotating twin-screw extruder with a KT20 gravimetric twin-screw feeder (Coperion K-Tron, Stuttgart, Germany). The screw diameter of the extruder was 27 mm with a length/diameter ratio of 40:1. The extruder barrel consisted of nine heating zones. High moisture (HM) extrudates were made using a cooling die, while low moisture (LM) extrudates exited the extruder through a regular die. The LM extruded products were dried for 14 minutes at 135° C. in a belt dryer (Drying Mate A/S, Viby, Denmark).

Extrudates were produced from either soy protein concentrate (SPC), Vegacon 70 with a protein content of 67 g/100 g dm (dry matter) from Eurosoy, soy protein isolate (SPI), Vegacon 90 with a protein content of 86 g/100 g dm from Eurosoy, or pea protein concentrate (PPC), E1155X with a protein content of 55 g/100 g dm from Vestkorn.

The raw material was fed into the extruder in the first zone. Protease was mixed into the water, which was fed into the extruder in zone 2.

Three different sets of trials were run using the settings of Table 1. Further details on the trials as well as the outcome can be seen in Examples 3-9.

TABLE 1

| Extrusion settings | | | |
|---|---|---|---|
| Trial number | 1 | 2 | 3 |
| Extrusion type | HM | HM | LM |
| Raw material | SPC | SPI | PPC |
| Moisture content (%) | 66 | 70 | 7.5 |
| Screw speed (rpm) | 730 | 550 | 830 |
| Temperature (° C.) profile | 50 | 50 | 50 |
| in barrel zones (1-9) | 80 | 80 | 80 |
| | 120 | 120 | 115 |
| | 150 | 130 | 150 |
| | 160 | 130 | 155 |
| | 170 | 130 | 160 |
| | 170 | 130 | 160 |
| | 160 | 120 | 160 |
| | 150 | 100 | 155 |

Example 2

Extrusion Settings for High Moisture Extrusion Using Alcalase Pure (Trial 4)

Extrusion trials for testing of Protease 3 were carried out using a laboratory scale extruder (Process 11, Thermo Fisher Scientific, Karlsruhe, Germany). The extruder was an intermeshing, corotating twin-screw extruder. The barrel diameter and its length to diameter were 11 mm and 40:1, respectively. The raw material was metered into the extruder by a gravimetric twin-screw feeder (MT-S, MiniTwin, Brabender Technologie, Duisburg, Germany). The extruder had 7 internal and 1 external heating zones. High moisture (HM) extrudates were made using a cooling die.

Extrudates were produced from soy protein concentrate (SPC), Vegacon 70 from Eurosoy, using the settings given in Table 2. Further details on the trials as well as the outcome can be seen in Example 3.

TABLE 2

| Extrusion settings | |
|---|---|
| Trial number | 4 |
| Extrusion type | HM |
| Raw material | SPC |
| Moisture content (%) | 60 |
| Screw speed (rpm) | 225 |
| Temperature (° C.) profile | 50 |
| in barrel zones (1-9) | 80 |
| | 130 |
| | 160 |
| | 160 |
| | 160 |
| | 160 |
| | 65 |

Example 3

Degree of Hydrolysis (DH) of HM and LM Extrudates

DH refers to the percentage of peptide bonds cleaved versus the starting number of peptide bonds. For example, if a starting protein containing five hundred peptide bonds is hydrolysed until fifty of the peptide bonds are cleaved, then the DH of the resulting hydrolysate is 10%. The higher the degree of hydrolysis the better the protein solubility (SE Molina Ortiza and JR Wagner, Food Research International 35 (2002) 511-518). However, even a moderate increase in DH improves the solubility and functionality, see e.g. US 20080305212.

To measure the specific effect of the proteases in the extrudates, DH was determined using the following procedure:

DH was determined by using the o-phthalaldehyde (OPA) assay. For this, each hydrolysate (and non-hydrolyzed starting material) was diluted to 2.5% dry matter and afterwards diluted 1:20. 20 μl aliquot of each sample/standard was transferred to microtiter plates (MTP) and 200 μl OPA reagent was added (OPA reagent: The following reagents are weighed in 100 ml measuring flask and dissolved in milli Q water, milli Q water added up to 100 ml: 0.504 g Sodium bicarbonate, 0.4293 g Sodium carbonate decahydrate, 100 mg Sodium dodecyl sulphate (SDS) 88 g di-thiotritol (DTT), 80 mg o-phthaldehyde (OPA) dissolved in 2 ml 96% ethanol).

The absorbance was measured at 340 nm. A standard curve with L-serine (0-0.5 mg/ml) was made: 125 mg L-serine was mixed in 250 ml MQ water and diluted 2, 4, 8, 16, 32 and 64 fold. DH was calculated as related to the serine standard:

$$DH\ (\%) = \frac{Ser\text{-equivalents in sample (mg } Ser\text{/ml)} * \text{Dilution factor (ml/g)} * 100\%}{\text{Protein content in samples (g/100 g)} * 1000\text{(mg/g)}}$$

Results are given in Table 3-5.

TABLE 3

| DH of HM extruded SPC (Trials 1 and 4) | | | |
|---|---|---|---|
| Protease added during extrusion | Dose (mg EP/ kg protein) | DH (%) | Delta DH (%) |
| Control | 0 | 1.1 +/− 0.2 | — |
| Protease 1 | 49 | 2.3 +/− 0.1 | 1.2 |
| Protease 1 | 140 | 4.0 +/− 0.1 | 2.9 |
| Protease 2 | 490 | 1.9 +/− 0.1 | 0.8 |
| Protease 2 | 4900 | 3.1 +/− 0.1 | 2.0 |
| Protease 3 | 842 | 1.2 +/− 0.1 | 0.2 |

TABLE 4

| DH of HM extruded SPI (Trial 2) | | | |
|---|---|---|---|
| Protease added during extrusion | Dose (mg EP/ kg protein) | DH (%) | Delta DH (%) |
| Control | 0 | 0.8 +/− 0.0 | — |
| Protease 1 | 6.8 | 1.9 +/− 0.2 | 1.1 |
| Protease 1 | 90 | 7.8 +/− 0.2 | 7.0 |

TABLE 5

| DH of LM extruded PPC (Trial 3) | | | |
|---|---|---|---|
| Protease added during extrusion | Dose (mg EP/ kg protein) | DH (%) | Delta DH (%) |
| Control | 0 | 2.7 +/− 0.0 | — |
| Protease 1 | 23 | 2.8 +/− 0.1 | 0.1 |
| Protease 1 | 70 | 3.2 +/− 0.1 | 0.5 |
| Protease 2 | 301 | 3.0 +/− 0.1 | 0.3 |
| Protease 2 | 905 | 3.5 +/− 0.1 | 0.7 |

Conclusion: An increased % DH is seen for the thermostable proteases (Protease 1 and 2) both in the HM and in the LM extrudates and both when using SPC, SPI and PPC as substrate. An increased DH leads to better solubility and thus functionality in the final application. The thermostable proteases (Protease 1 and 2) give a higher increase in DH than the medium temperature stable protease Alcalase Pure (Protease 3).

Example 4

Density of LM Extrudates

The density of the LM extrudates was evaluated by weighing out 200 g of each extrudate in 2000 ml beakers and measuring the volume for each treatment. The density was then calculated in g/l. Results are given in Table 6.

TABLE 6

Density of LM extruded PPC (Trial 3)

| Protease added during extrusion | Dose (mg EP/kg protein) | Density (g/l) |
|---|---|---|
| Control | 0 | 140 |
| Protease 1 | 23 | 180 |
| Protease 1 | 70 | 200 |
| Protease 2 | 301 | 170 |
| Protease 2 | 905 | 160 |

Conclusion: The effect of the protease treatment resulted in a significant increase of density of the extrudates. Increased density is by meat analogue experts related to improved quality, as the higher the density, the meatier and denser the final patty or sausages will appear.

Example 5

Secondary Protein Structure of HM Extruded SPC by FT-IR

FT-IR analysis was done in order to investigate the secondary protein structure of the HM extrudates (M Carbonaro et al. (2012) Amino Acids. Vol. 43, pp. 911-921).

The absorbance measurements were performed using a MB3000 MID FT-IR Spectrometer (ABB) with a DTGS detector and equipped with an ATR (Attenuated Total Reflectance) device with a single reflection diamond crystal. All samples were run as triplicates taken from the centre of the extrudate. The sample was positioned on the crystal surface and squeezed towards the diamond crystal by use of a concave needle compressor. IR spectra were recorded in the range from 4000-550 $cm^{-1}$ using a spectral resolution of 4 $cm^{-1}$. Each spectrum represents the average of 32 scans ratioed against the background (64 scans) collected with the empty crystal and stored as absorbance spectra.

The spectra were analysed using LatentiX (v. 2.13). The spectral region containing the amide I band (1700-1600 $cm^{-1}$) arising from the stretching vibrations of C═O in the peptide bonds was examined. The vibration energies of the carboxyl group depend on the different conformations of the protein, such as β-sheet and α-helix structures, β- and α-turns, and inter- or intra-molecular aggregates. Calculating the second derivatives of the spectra makes it possible to assign the spectral components of the amide I band. Principal component analysis (PCA) was performed and scores and loadings examined in order to study the relationships between or within the different samples and variables and to detect trends, groupings and outliers. The PCA analysis is used as an explorative analysis and not directly as a quantitative measure. The findings from the PCA score plot has been translated into a semi quantitative measure given as a number of pluses. The conclusions drawn from the PCA are summarised in Table 7.

TABLE 7

Secondary structure of proteins in HM extrudates of SPC (Trial 1) determined by FT-IR

| Protease added during extrusion | Dose (mg EP/kg protein) | Ordered structures (α-helixes and β-sheets) | Unordered structures (random coil) | Intermolecular protein complexes/ aggregated strands |
|---|---|---|---|---|
| Control | 0 | +++ | +++ | + |
| Protease 1 | 49 | ++ | ++ | ++ |
| Protease 1 | 140 | ++ | ++ | ++ |
| Protease 1 | 490 | + | + | +++ |
| Protease 2 | 490 | +++ | +++ | + |
| Protease 2 | 4900 | ++ | ++ | ++ |

Conclusion: The increased level of protein hydrolysis due to protease action during extrusion leads to a final extrudate with less intramolecular alpha-helix and beta-sheet structures and a higher level of intermolecular protein interactions. Even though extrudates treated with Protease 2 in low concentration does not show a significant difference from the control in the PCA score plot, the difference measured by the quantitative analysis % DH (Example 3) is still valid.

Example 6

Formulation of Patties and Texture Analysis of HM Extruded SPC

High-moisture SPC extrudate comprising 23% protein (w/w) and 67% water (w/w) were minced in a Kenwood meat grinder (grinder plate with 8 mm holes). The following ingredients were mixed to prepare burger patties: 90 g extruded SPC (comprising 20.5 g protein), 2.2 g potato starch, 1.1 g NaCl and 22.5 ml water. A control comprising methylcellulose was included. The extrudate was mixed with potato starch and salt. For patties containing methylcellulose, 1.1 g methylcellulose was added. After the first mixing, water was added, and the mince was mixed again and stored for 30 min in the fridge. From each mince, 5×20 g was weighed out and shaped into patties using a metal ring (4.5 cm in diameter). One set of patties was stored for 1 h in the fridge before measuring the texture. Another set of patties was cooked on a frying pan for 2×4 minutes reaching a core temperature of 80° C. The cooked patties were allowed to reach 25° C. before measuring the texture.

Texture analysis was performed using a Texture Analyser (Ta.XT.Plus, Stable Micro Systems, UK) fitted with a Warner Bratzler blade, 3 mm thick with a rounded end. All burger patties were subjected to a two-cycle compression test (TPA) (Breene W M, Application of texture profile analysis to instrumental food texture evaluation. J Texture Stud 6:53-82 (1975)). Samples were compressed to 50% of their original height with a test speed of 5 mm $s^{-1}$ and post-test speed of 5 mm $s^{-1}$. Chewiness was calculated as: max peak force*(Area 2/Area 1)*Distance 2/Distance 1. Adhesiveness was calculated using the area (Area 3) over the negative stress-strain curve after the first compression.

Results are given in Table 8.

TABLE 8

Texture analysis of HM extrudates from SPC (Trial 1)

| Protease added during extrusion | Dose (mg EP/ kg protein) | Methyl cellulose addition during formulation | Raw patty - Adhesiveness (g*sec) | Cooked patty - Chewiness No unit |
|---|---|---|---|---|
| Control | 0 | — | −11 | 44 |
| Control | 0 | MC | −69 | 48 |
| Protease 1 | 49 | — | −95 | 48 |
| Protease 1 | 140 | — | −196 | 48 |

Conclusion: Texture analysis of the raw patties showed that protease addition during wet extrusion increased the adhesiveness of the mince to a higher degree than methylcellulose addition (more negative values means higher adhesiveness). Hence, the protease addition would yield burger patties which would be easier to shape, and it would be easier to retain the coherency. No adverse effects were observed on the texture of the cooked product and the chewiness was slightly higher than the control and similar to the methyl cellulose containing burger patty.

Example 7

Formulation of Patties and Texture Analysis of LM Extruded PPC 100 g of low-moisture PPC extrudate comprising 46% protein (w/w) and 16% water (w/w) was soaked in excess of water for 30 min. The water was drained, and the soaked extruded PPC was minced as described for the HM extrudates in Example 6.

The following ingredients were mixed to prepare the burger patties: 110 g soaked extruded PPC (comprising 17 g protein), 2.2 g potato starch and 1.1 g NaCl. A control comprising methylcellulose was included. The extruded PPC was mixed with potato starch and salt, and for the patties containing methylcellulose 1.1 g methylcellulose was added. After first mixing the mince was stored for 30 min in the fridge. From each mince 5×20 g was weighed out and shaped to patties using a metal ring (4.5 cm in diameter). One set of patties was stored for 1 h in the fridge before measuring the texture. Another set of patties was cooked on a frying pan for 2×4 minutes reaching a core temperature of 80° C. The cooked patties were allowed to reach 25° C. before measuring the texture.

Results are given in Table 9.

TABLE 9

Texture analysis of LM extrudates from PPC (Trial 3)

| Protease added during extrusion | Dose (mg EP/ kg protein) | Methyl cellulose addition during formulation | Raw patty - Adhesiveness (g*sec) | Cooked patty - Chewiness |
|---|---|---|---|---|
| Control | 0 | — | −36 | 59 |
| Control | 0 | MC | −77 | — |
| Protease 1 | 23 | — | −106 | 67 |
| Protease 1 | 70 | — | −141 | 58 |
| Protease 2 | 905 | — | −107 | 67 |

Conclusion: Texture analysis of raw patties showed that protease addition during LM extrusion of PPC increased the adhesiveness of the mince to a higher degree than methylcellulose addition during formulation. Hence, the low protease addition would yield burger patties which would be easier to shape, and it would be easier to retain the coherency. No adverse effects were observed on the texture of the cooked product in comparison to the control as measured by chewiness.

Example 8

Water Holding Capacity of HM and LM Extrudates by Low Field NMR

The water holding capacity (WHC) of patties made of plant-based meat analogues is of importance for both cohesiveness and juiciness when eaten. The correlation between transverse relaxation $T_2$ based on low field $^1H$ nuclear magnetic resonance (LF-NMR) and water holding capacity (WHC) has been proven in various papers (e.g., HC Bertram et al. in Meat Science 57 (2001) 125-132 and Massimo Lucarini et al in Foods (2020) 9, 480).

The molecular mobility of water and biopolymers in food products can be studied with proton nuclear magnetic resonance LF-NMR detecting both longitudinal or spin-lattice relaxation times ($T_1$) and transverse or spin—spin relaxation times ($T_2$) of protons in a magnetic field.

Patties were prepared as described in Example 6 and analysed at 5° C. The relaxation measurements were performed on a Minispec mq20 pulsed NMR spectrometer (Bruker Biospin, Rheinstetten, Germany) with a magnetic field strength of 0.47 Tesla, with a corresponding resonance frequency for protons of 20 MHz. Transverse relaxation $T_2$ was measured using the Carr-Purcell-Meiboom-Gill (CPMG) pulse sequence. A total of 2000 data points were acquired with a 90-180 pulse spacing ($\tau$) value of 60 μs. Four scans were accumulated with a recycle delay of 1 s.

Relaxation time constants $T_{2n}$ and corresponding relative population size $f_n$ were determined by discrete multi-exponential fitting including deconvolution of the relaxation curve into n exponential components. The number of proton populations was determined by inspecting the residual error after fitting. The residual error revealed whether the curve was modelled by the correct number of components.

Results are given in Tables 10, 11 and 12.

TABLE 10

Relaxation Time constants $T_{21}$, $T_{22}$ and $T_{23}$ and relative population size $f_1$, $f_2$ and $f_3$ determined by LF-NMR of HM extruded SPC (Trial 1)

| Protease added during extrusion | Dose (mg EP/kg protein) | $T_{21}$ [ms] | $T_{22}$ [ms] | $T_{23}$ [ms] | $f_1$ [%] | $f_2$ [%] | $f_3$ [%] |
|---|---|---|---|---|---|---|---|
| Control | 0 | 3.3 | 19.8 | 68.8 | 7.6 | 53.8 | 38.6 |
| Protease 1 | 49 | 3.5 | 18.3 | 58.3 | 7.6 | 43.0 | 49.4 |
| Protease 1 | 490 | 3.2 | 17.8 | 55.7 | 8.5 | 35.4 | 56.1 |

TABLE 10-continued

Relaxation Time constants $T_{21}$, $T_{22}$ and $T_{23}$ and relative population size $f_1$, $f_2$ and $f_3$ determined by LF-NMR of HM extruded SPC (Trial 1)

| Protease added during extrusion | Dose (mg EP/kg protein) | $T_{21}$ [ms] | $T_{22}$ [ms] | $T_{23}$ [ms] | $f_1$ [%] | $f_2$ [%] | $f_3$ [%] |
|---|---|---|---|---|---|---|---|
| Protease 2 | 490 | 3.6 | 17.1 | 48.3 | 8.1 | 48.2 | 43.7 |
| Protease 2 | 4900 | 2.5 | 15.6 | 47.3 | 7.0 | 39.6 | 53.4 |

TABLE 11

Relaxation Time constants $T_{21}$, $T_{22}$ and $T_{23}$ and relative population size $f_1$, $f_2$ and $f_3$ determined by LF-NMR of HM extruded SPI (Trial 2)

| Protease added during extrusion | Dose (mg EP/kg protein) | $T_{21}$ [ms] | $T_{22}$ [ms] | $T_{23}$ [ms] | $f_1$ [%] | $f_2$ [%] | $f_3$ [%] |
|---|---|---|---|---|---|---|---|
| Control | 0 | 4.7 | 21.2 | 0 | 4.9 | 95.1 | 0 |
| Protease 1 | 6.8 | 0.5 | 19.7 | 36.3 | 6.3 | 74.5 | 19.2 |
| Protease 1 | 90 | 2.8 | 21.6 | 45.8 | 3.1 | 73.6 | 23.3 |

TABLE 12

Relaxation Time constants $T_{21}$, $T_{22}$ and $T_{23}$ and relative population size $f_1$, $f_2$ and $f_3$ determined by LF-NMR of LM extruded PPC (Trial 3)

| Protease added during extrusion | Dose (mg EP/kg protein) | $T_{21}$ [ms] | $T_{22}$ [ms] | $T_{23}$ [ms] | $f_1$ [%] | $f_2$ [%] | $f_3$ [%] |
|---|---|---|---|---|---|---|---|
| Control | 0 | 2.1 | 13.8 | 30.5 | 7.1 | 55.8 | 37.1 |
| Protease 1 | 23 | 2.6 | 13.7 | 30.0 | 8.2 | 53.5 | 38.3 |
| Protease 1 | 70 | 1.4 | 12.4 | 29.1 | 5.9 | 45.0 | 49.1 |

Conclusion: Three proton populations were identified with different $T_2$ values, which were assigned to water populations of various mobilities. The fractions having the lower mobility water is designated $T_{21}$ and $T_{22}$, while the fraction representing the higher mobility water is designated $T_{23}$.

Protease treated samples exhibited a higher relative amount of $T_{23}$ population ($f_3$) while $f_1$ and/or $f_2$ de-creased. This indicates higher relative amounts of high mobility/free water in the protease treated samples in comparison with the control. The presence of more loosely bound water as an effect of the protease treatment is expected to relate to increased WHC. This will in turn lead to more adhesiveness and juiciness of the formulated patties.

Example 9

Residual Protease Activity in HM and LM Extrudates

Residual activity of the proteases was tested by using the assay described below.

Standards representing the used doses were prepared.

0.2 M sodium borate buffer: 12.366 g $H_3BO_4$+100 ml 1N NaOH was transferred to a 1000 ml volumetric flask. MQ water was added and pH adjusted to 9.1 with HCl. Buffer was diluted 1:2 before use (=0.1 M Na-borate).

Substrate: 1.5 g skim milk powder was transferred to a 50 ml volumetric flask and filled up with 0.1 M Na-borate buffer.

A dilution series was made for each enzyme (standard curves). 2 determinations were made for each sample. MQ water was used as blank.

50 μl of sample was pipetted into a microtiter plate and just before measurement, 200 μl of substrate was added. The absorbance was measured at 405 nm for 10-12 min. The sample was shaken before each measurement and measured every 30 s.

A decrease in absorbance corresponds to protease activity. I.e. if the control without protease and the protease treated extrudate samples show a similar absorbance over time, measured as the delta absorption at 405 nm from 0 to 12 min (Delta Absorption at 405 nm $A_{12\ min}$-$A_{0\ min}$) it can be concluded that no residual activity is present in the extrudates given that the standards show a dosage dependant reduction in absorption.

Results are given in Delta Absorption at 405 nm $A_{12\ min}$-$A_{0\ min}$ and appear from Tables 13-15

TABLE 13

| HM extrudates of SPC (Trial 1) | | |
|---|---|---|
| Protease added during extrusion | Dose (mg EP/ kg protein) | Delta Absorption at 405 nm $A_{12}$ min − $A_0$ min |
| Control | 0 | 0.15 |
| Protease 1 | 49 | 0.15 |
| Protease 1 | 140 | 0.15 |
| Protease 2 | 490 | 0.14 |
| Protease 2 | 4900 | 0.13 |

TABLE 14

| HM extrudates of SPI (Trial 2) | | |
|---|---|---|
| Protease added during extrusion | Dose (mg EP/ kg protein) | Delta Absorption at 405 nm $A_{12}$ min − $A_0$ min |
| Control | 0 | 0.17 |
| Protease 1 | 7 | 0.16 |
| Protease 1 | 23 | 0.19 |

TABLE 15

| LM extrudates of PPC (Trial 3) | | |
|---|---|---|
| Protease added during extrusion | Dose (mg EP/ kg protein) | Delta Absorption at 405 nm $A_{12}$ min − $A_0$ min |
| Control | 0 | 0.28 |
| Protease 1 | 70 | 0.25 |
| Protease 2 | 4900 | 0.26 |

As the control without protease and the protease treated extrudate samples showed a similar low, delta absorbance over time (Delta Absorption at 405 nm $A_{12\ min}$-$A_{0\ min}$) it can be concluded that no residual activity is present in the extrudates. Then the temperature range applied in the later sections of the extruder was as expected sufficient to secure a full inactivation of the protease samples.

Example 10

Extrusion Settings for High Moisture Extrusion Using Thermostable Proteases (Trial 5)

Extrusion trials for repeated testing of Protease 1 were carried out using a pilot-scale extruder (Coperion, ZsK, Stuttgart, Germany). The extruder was an intermeshing, co-rotating twin-screw extruder with a KT20 gravimetric twin-screw feeder (Coperion K-Tron, Stuttgart, Germany). The screw diameter of the extruder was 26 mm with a length/diameter ratio of 40:1. The extruder barrel consisted of five heating zones. High moisture (HM) extrudates were made using a cooling die with three segments.

Extrudates were produced from soy protein concentrate (SPC) with a protein content of 71.5 g/100 g dm (dry matter) from ADM.

The raw material was fed into the extruder in the first zone. Protease was mixed into the water, which was fed into the extruder in zone 2. Extrusion settings are given in Table 16. Further details on the trials as well as the outcome can be seen in Example 11.

TABLE 16

| Extrusion settings | |
|---|---|
| Trial number | 5 |
| Extrusion type | HM |
| Raw material | SPC |
| Moisture content (%) | 72 |
| Screw speed (rpm) | 250 |
| Temperature (° C.) profile in barrel zones (1-9) | 30<br>60<br>90<br>120<br>155 |

Example 11

Formulation of Patties with Varying Amounts of Protease Treated HM Extruded SPC (Trial 5) and Analysis of Water Holding Capacity, Texture Analysis and LF-NMR High-moisture SPC extrudate (from Trial 5) comprising 18% protein (w/w) and 72% water (w/w) was shredded (pulse ~10-30 sec, visual inspection) in a Food Processor (Bosch Multitalent 3). The following ingredients were mixed to prepare burger patties: 80 g extruded SPC (comprising 14.4 g protein), 80 ml water, 20 g rapeseed oil, 14 g soy isolate, 4 g potato starch, 2 g NaCl. The added amount of extrudate is a combination of protease treated and non-protease treated extrudate. 4 different patties were prepared with varying amounts as given in Table 17.

TABLE 17

| Amount of protease treated and non-treated HM extrudates from SPC (Trial 5) | | | | | |
|---|---|---|---|---|---|
| Protease added during extrusion | Dose (mg EP/kg protein) | Patty A Amount of extrudate (g) | Patty B Amount of extrudate (g) | Patty C Amount of extrudate (g) | Patty D Amount of extrudate (g) |
| Control | 0 | 80 | 70 | 60 | 48 |
| Protease 1 | 625 | 0 | 10 | 20 | 32 |

An emulsion was made by adding soy isolate, salt, potato starch and water to the oil while mixing 1 min. with a hand mixer at level 1. The shredded extrudates were added to the emulsion and mixed for 30 sec. for at level 1. The mince was refrigerated overnight.

Water holding capacity (WHC) was measured at 25° C. by use of the following method:

50 ml tubes were weighed (triple determinations for each sample). 5 g sample was weighed into each tube. Deionized water was added in excess (16 ml). Samples were placed in a rotator (20 rpm) at room temperature for 15 min. The samples were centrifuged at 4600 rpm for 10 min at 20° C. The supernatant was carefully discarded, using a cotton swab to remove fatty residues on the inside of the tube. The tubes containing precipitate were weighed again and WHC was calculated.

LF-NMR was measured directly on the mince at 5° C. and 75° C. as described in example 8.

From each mince, 50 g patties were shaped using a metal ring (6.5 cm in diameter). One set of patties were fried in a pan at 500 W for 6 min on each side. The pan was lightly sprayed with oil prior to frying. The cooked patties were allowed to reach 25° C. before measuring the texture. Texture analysis was performed as described in Example 6.

Results are given in Tables 18-20.

TABLE 18

| WHC and texture analysis of mince and patties with varying amounts of protease treated HM extruded SPC | | | |
|---|---|---|---|
| Patty | WHC (% in relation to DM) 25° C. | Adhesiveness raw (g*sec) | Adhesiveness fried (g*sec) |
| A | 147 | −397 | −2 |
| B | 153 | −325 | −1 |
| C | 165 | −559 | −1 |
| D | 140 | −520 | 0 |

Conclusion: The raw mince comprising protease treated extrudate shows an increase in WHC and/or a higher adhesiveness in the raw mince while the adhesiveness of the fried patties is lower when protease treated extrudate is included. As described in Example 8, WHC is expected to correlate to higher juiciness of the final patty. An increase in adhesiveness of the raw patties and a decrease for the fried patties is positive since adhesiveness is wanted during formulation but not in the final product.

TABLE 19

Relaxation Time constants $T_{21}$, $T_{22}$ and $T_{23}$ and relative population size $f_1$, $f_2$ and $f_3$ determined by LF-NMR at 5° C.

| Patty | $T_{21}$ [ms] | $T_{22}$ [ms] | $T_{23}$ [ms] | $f_1$ [%] | $f_2$ [%] | $f_3$ [%] |
|---|---|---|---|---|---|---|
| A | 13.0 | 42.3 | 103.2 | 12.6 | 57.4 | 30.0 |
| B | 12.3 | 42.1 | 97.0 | 10.5 | 57.0 | 32.5 |

TABLE 19-continued

Relaxation Time constants $T_{21}$, $T_{22}$ and $T_{23}$ and relative population size $f_1$, $f_2$ and $f_3$ determined by LF-NMR at 5° C.

| Patty | $T_{21}$ [ms] | $T_{22}$ [ms] | $T_{23}$ [ms] | $f_1$ [%] | $f_2$ [%] | $f_3$ [%] |
|---|---|---|---|---|---|---|
| C | 7.5 | 36.9 | 90.9 | 6.9 | 52.4 | 40.7 |
| D | 8.4 | 38.0 | 91.6 | 8.3 | 52.1 | 39.6 |

TABLE 20

Relaxation Time constants $T_{21}$, $T_{22}$ and $T_{23}$ and relative population size $f_1$, $f_2$ and $f_3$ determined by LF-NMR at 75° C.

| Patty | $T_{21}$ [ms] | $T_{22}$ [ms] | $T_{23}$ [ms] | $f_1$ [%] | $f_2$ [%] | $f_3$ [%] |
|---|---|---|---|---|---|---|
| A | 19.8 | 47.6 | 235.2 | 33.1 | 46.8 | 20.1 |
| B | 14.5 | 43.0 | 219.4 | 19.8 | 57.0 | 23.3 |
| C | 15.5 | 44.8 | 219.8 | 21.6 | 54.9 | 23.5 |
| D | 17.9 | 51.0 | 230.7 | 28.8 | 48.7 | 22.5 |

Conclusion: All samples comprising protease treated extrudate exhibited a higher relative amount of $T_{23}$ population ($f_3$) while $f_1$ and/or $f_2$ decreased. This indicates higher relative amounts of high mobility/free water in the samples comprising protease treated extrudate in comparison with the control comprising only non-treated HM extrudate. The presence of more loosely bound water as an effect of the protease treatment is expected to relate to increased WHC. This will in turn lead to more adhesiveness and juiciness of the formulated patties.

The invention claimed is:

1. A method for producing a meat analogue product comprising the following steps:

a) texturizing a non-animal protein (i) by passing it through an extruder comprising a barrel, at least one screw and a nozzle or cooling die, or (ii) by shear cell technology, thereby forming at least one string or slab of texturized protein material which is optionally cut into granulates, b) adding a thermostable endopeptidase to at least part of the non-animal protein before or during step a), so that the thermostable endopeptidase is in contact with the non-animal protein for at most 5 minutes before the start of step a), and without the non-animal protein being pre-incubated with the endopeptidase before step a), and c) mixing the non-animal protein with other ingredients to obtain the meat analogue product, wherein the mixing with other ingredients may be performed before step a), after step a) and/or after step b), wherein the meat analogue product has an adhesiveness which is at least 20% better and a chewiness which is at most 5% reduced compared to a meat analogue product produced by the same method but without the addition of a thermostable endopeptidase.

2. The method of claim 1, wherein the non-animal protein is plant protein.

3. The method of claim 1, wherein the non-animal protein is a non-animal protein flour, non-animal protein flakes, a non-animal protein concentrate or a non-animal protein isolate.

4. The method of claim 1, where in step a) the non-animal protein is passed through a twin screw extruder.

5. The method of claim 1, wherein the meat-analogue product is a minced-meat analogue product, a burger patty, a sausage, a meat-ball analogue product, a chicken nugget analogue product, a gullasch meat analogue product or a schnitzel analogue product.

6. The method of claim 1, wherein the thermostable endopeptidase is a non-specific endopeptidase.

7. The method of claim 1, wherein the thermostable endopeptidase (i) has at least 60% sequence identity to the polypeptide of any of SEQ ID NOs: 1 or 2, (ii) is encoded by a polynucleotide having at least 60% sequence identity to the coding sequence of any of SEQ ID NOs: 1 or 2, or (iii) is a variant of the polypeptide of any of SEQ ID NOs: 1 or 2 comprising a substitution, deletion, and/or insertion at one or more positions.

8. The method of claim 1, wherein the endopeptidase is in contact with the non-animal protein at most 3 minutes before step a).

9. The method of claim 1, wherein the endopeptidase is added to the non-animal protein immediately before or during step a).

10. The method of claim 1, wherein the non-animal protein which has been subjected to steps a) and b) is mixed with non-animal protein which has been texturized without adding a thermostable endopeptidase before or during texturization.

11. The method of claim 1, wherein at least 5% (w/w) of texturized non-animal protein in the meat-analogue product has been subjected to addition of a thermostable endopeptidase before or during texturization.

12. The method of claim 1, wherein the meat analogue product before cooking comprises 5-40% (w/w) texturized non-animal protein.

13. The method of claim 1, wherein the other ingredients excluding water constitute 2-50% (w/w) of the meat analogue product before cooking.

14. The method of claim 1, wherein the meat analogue product does not comprise methylcellulose.

15. The method of claim 1, wherein the texturized protein material is minced or shredded following step b) and before step c).

16. The method of claim 1, wherein the thermostable endopeptidase (i) has at least 80% sequence identity to the polypeptide of any of SEQ ID NOs: 1 or 2.

17. The method of claim 1, wherein the thermostable endopeptidase (i) has at least 90% sequence identity to the polypeptide of any of SEQ ID NOs: 1 or 2.

18. The method of claim 1, wherein the thermostable endopeptidase (i) has at least 95% sequence identity to the polypeptide of any of SEQ ID NOs: 1 or 2.

* * * * *

SEQUENCE LISTING

```
<160> NUMBER OF SEQ ID NOS: 2

<210> SEQ ID NO 1
<211> LENGTH: 413
<212> TYPE: PRT
<213> ORGANISM: Pyrococcus furiosus

<400> SEQUENCE: 1

Ala Glu Leu Glu Gly Leu Asp Glu Ser Ala Ala Gln Val Met Ala Thr
1               5                   10                  15

Tyr Val Trp Asn Leu Gly Tyr Asp Gly Ser Gly Ile Thr Ile Gly Ile
            20                  25                  30

Ile Asp Thr Gly Ile Asp Ala Ser His Pro Asp Leu Gln Gly Lys Val
        35                  40                  45

Ile Gly Trp Val Asp Phe Val Asn Gly Arg Ser Tyr Pro Tyr Asp Asp
    50                  55                  60

His Gly His Gly Thr His Val Ala Ser Ile Ala Ala Gly Thr Gly Ala
65                  70                  75                  80

Ala Ser Asn Gly Lys Tyr Lys Gly Met Ala Pro Gly Ala Lys Leu Ala
                85                  90                  95

Gly Ile Lys Val Leu Gly Ala Asp Gly Ser Gly Ser Ile Ser Thr Ile
            100                 105                 110

Ile Lys Gly Val Glu Trp Ala Val Asp Asn Lys Asp Lys Tyr Gly Ile
        115                 120                 125

Lys Val Ile Asn Leu Ser Leu Gly Ser Ser Gln Ser Ser Asp Gly Thr
    130                 135                 140

Asp Ala Leu Ser Gln Ala Val Asn Ala Ala Trp Asp Ala Gly Leu Val
```

-continued

```
145                 150                 155                 160

Val Val Val Ala Ala Gly Asn Ser Gly Pro Asn Lys Tyr Thr Ile Gly
                165                 170                 175

Ser Pro Ala Ala Ala Ser Lys Val Ile Thr Val Gly Ala Val Asp Lys
            180                 185                 190

Tyr Asp Val Ile Thr Ser Phe Ser Ser Arg Gly Pro Thr Ala Asp Gly
        195                 200                 205

Arg Leu Lys Pro Glu Val Val Ala Pro Gly Asn Trp Ile Ile Ala Ala
    210                 215                 220

Arg Ala Ser Gly Thr Ser Met Gly Gln Pro Ile Asn Asp Tyr Tyr Thr
225                 230                 235                 240

Ala Ala Pro Gly Thr Ser Met Ala Thr Pro His Val Ala Gly Ile Ala
                245                 250                 255

Ala Leu Leu Leu Gln Ala His Pro Ser Trp Thr Pro Asp Lys Val Lys
            260                 265                 270

Thr Ala Leu Ile Glu Thr Ala Asp Ile Val Lys Pro Asp Glu Ile Ala
        275                 280                 285

Asp Ile Ala Tyr Gly Ala Gly Arg Val Asn Ala Tyr Lys Ala Ile Asn
    290                 295                 300

Tyr Asp Asn Tyr Ala Lys Leu Val Phe Thr Gly Tyr Val Ala Asn Lys
305                 310                 315                 320

Gly Ser Gln Thr His Gln Phe Val Ile Ser Gly Ala Ser Phe Val Thr
                325                 330                 335

Ala Thr Leu Tyr Trp Asp Asn Ala Asn Ser Asp Leu Asp Leu Tyr Leu
            340                 345                 350

Tyr Asp Pro Asn Gly Asn Gln Val Asp Tyr Ser Tyr Thr Ala Tyr Tyr
        355                 360                 365

Asp Phe Glu Lys Val Gly Tyr Tyr Asn Pro Thr Asp Gly Thr Trp Thr
    370                 375                 380

Ile Lys Val Val Ser Tyr Ser Gly Ser Ala Asn Tyr Gln Val Asp Val
385                 390                 395                 400

Val Ser Asp Gly Ser Leu Ser Gln Pro Gly Ser Leu Pro
                405                 410


<210> SEQ ID NO 2
<211> LENGTH: 188
<212> TYPE: PRT
<213> ORGANISM: Nocardiopsis sp.

<400> SEQUENCE: 2

Ala Asp Ile Ile Gly Gly Leu Ala Tyr Thr Met Gly Gly Arg Cys Ser
1               5                   10                  15

Val Gly Phe Ala Ala Thr Asn Ala Ala Gly Gln Pro Gly Phe Val Thr
            20                  25                  30

Ala Gly His Cys Gly Arg Val Gly Thr Gln Val Thr Ile Gly Asn Gly
        35                  40                  45

Arg Gly Val Phe Glu Gln Ser Val Phe Pro Gly Asn Asp Ala Ala Phe
    50                  55                  60

Val Arg Gly Thr Ser Asn Phe Thr Leu Thr Asn Leu Val Ser Arg Tyr
65                  70                  75                  80

Asn Thr Gly Gly Tyr Ala Thr Val Ala Gly His Asn Gln Ala Pro Ile
                85                  90                  95

Gly Ser Ser Val Cys Arg Ser Gly Ser Thr Thr Gly Trp His Cys Gly
            100                 105                 110
```

-continued

```
Thr Ile Gln Ala Arg Gly Gln Ser Val Ser Tyr Pro Glu Gly Thr Val
        115                 120                 125

Thr Asn Met Thr Arg Thr Thr Val Cys Ala Glu Pro Gly Asp Ser Gly
    130                 135                 140

Gly Ser Tyr Ile Ser Gly Thr Gln Ala Gln Gly Val Thr Ser Gly Gly
145                 150                 155                 160

Ser Gly Asn Cys Arg Thr Gly Gly Thr Thr Phe Tyr Gln Glu Val Thr
                165                 170                 175

Pro Met Val Asn Ser Trp Gly Val Arg Leu Arg Thr
            180                 185
```